(12) United States Patent
Arquero et al.

(10) Patent No.: US 9,977,936 B2
(45) Date of Patent: May 22, 2018

(54) ITEM LOCATOR

(71) Applicant: INTERNATIONAL BUSINESS MACHINES CORPORATION, Armonk, NY (US)

(72) Inventors: Gregg M. Arquero, Poughkeepsie, NY (US); Eli M. Dow, Wappingers Falls, NY (US); Syed F. Hossain, Hopewell Junction, NY (US); Joshua Schaeffer, White Plains, NY (US); Yunli Tang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/275,799

(22) Filed: Sep. 26, 2016

(65) Prior Publication Data

US 2018/0089476 A1   Mar. 29, 2018

(51) Int. Cl.
| | |
|---|---|
| G08B 1/08 | (2006.01) |
| G06K 7/10 | (2006.01) |
| G01S 5/02 | (2010.01) |
| G01S 19/13 | (2010.01) |

(52) U.S. Cl.
CPC ........ G06K 7/10366 (2013.01); G01S 5/0294 (2013.01); G01S 19/13 (2013.01)

(58) Field of Classification Search
CPC .... G06K 7/10366; G01S 5/0294; G01S 19/13
See application file for complete search history.

(56) References Cited

U.S. PATENT DOCUMENTS

| | | |
|---|---|---|
| 5,389,790 A | 2/1995 | Honey et al. |
| 2005/0253707 A1 | 11/2005 | Clarke et al. |
| 2006/0082488 A1 | 4/2006 | Keller, III |
| 2008/0055155 A1* | 3/2008 | Hensley ............... A01K 11/008 342/357.31 |
| 2009/0085745 A1* | 4/2009 | Gupta .................. G06Q 10/087 340/572.1 |
| 2009/0216498 A1 | 8/2009 | Seguin et al. |
| 2010/0013603 A1* | 1/2010 | Chatani .................. G06Q 30/02 340/10.6 |

(Continued)

OTHER PUBLICATIONS

Chouchang Yang & Alanson P. Sample (EM-ID:Tag-less Identification of Electrical Devices via Electromagnetic Emissions) Apr. 27, 2016.*

(Continued)

*Primary Examiner* — Nabil Syed
(74) *Attorney, Agent, or Firm* — Cantor Colburn LLP; Steven Chiu

(57) ABSTRACT

A computer-implemented method for tracking an item having an electromagnetic frequency signature is provided. The method includes obtaining, using a processor system of a device, an electromagnetic frequency signature of an item. The item associated with the obtained electromagnetic frequency signature is identified and the location of the device at the time the item is identified. The identity of the item associated with the electromagnetic frequency signature and the location of the device at the time the electromagnetic frequency signature is obtained are recorded for associating the item with the location of the device.

9 Claims, 6 Drawing Sheets

(56) References Cited

U.S. PATENT DOCUMENTS

| | | | | |
|---|---|---|---|---|
| 2010/0046553 | A1* | 2/2010 | Daigle | G06F 21/35 |
| | | | | 370/474 |
| 2014/0327443 | A1 | 11/2014 | Liu et al. | |
| 2014/0361077 | A1* | 12/2014 | Davidson | G06Q 10/08 |
| | | | | 235/385 |
| 2016/0078261 | A1* | 3/2016 | Schutz | H04M 1/7253 |
| | | | | 340/10.1 |

OTHER PUBLICATIONS

Darren Quick, "MagnifiSense uses electromagnetic signatures to keep tabs on your energy use", www.gizmag.com, Sep. 9, 2015, pp. 1-4.

\* cited by examiner

| Item | Location | Time |
|---|---|---|
| Car Keys | Bedroom | 11:59 Monday |
| Wallet | Living Room | 1:15 Monday |
| House Keys | Kitchen | 2:00 Monday |

ITEM LOCATOR

BACKGROUND

Many household items such as keys, credit cards, and mobile phones emit an electromagnetic field having a particular waveform which may be identified. As such household items are customarily misplaced there is a need to provide a method to keep track of such items.

SUMMARY

In accordance with one or more embodiments, a computer-implemented method for tracking an item having an electromagnetic frequency signature is provided. The method includes obtaining, using a processor system of a device, an electromagnetic frequency signature of an item. The item associated with the obtained electromagnetic frequency signature is identified and the location of the device at the time the item is identified is noted. The identity of the item associated with the electromagnetic frequency signature and the location of the device at the time the electromagnetic frequency signature is obtained are recorded for associating the item with the location of the device.

In accordance with one or more embodiments, a system for tracking an item having an electromagnetic frequency system is provided. The system includes a processor system obtaining the electromagnetic frequency signature of an item. A Global Positioning System identifies the location of the processor system. An input receives the identification of the item having the electromagnetic frequency signature obtained by the processor system. The processor system associates the location of the processor system with the electromagnetic frequency signature of the item and identity of the item received by the input. A memory in communication with the processor system stores the identification location and electromagnetic frequency signature of the item for subsequent retrieval.

In accordance with one or more embodiments, a computer program product for tracking an item having an electromagnetic frequency signature is provided wherein the computer program product includes a computer readable storage medium having program instructions embodied therewith, wherein the computer readable storage medium is not a transitory signal per se, the program instructions being readable by a processing circuit to cause the processing circuit to perform a method which includes obtaining, using a processor system of a device, an electromagnetic frequency signature of an item. Identifying the item associated with the electromagnetic frequency signature and the location of the device at the time the item is identified. The identity of the item and location of the device at the time the electromagnetic frequency signature was obtained is recorded for associating the item with the location of the device.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 illustrates a database storing the location of items tracked via an electromagnetic frequency signature according to one or more embodiments;

DETAILED DESCRIPTION

Embodiments of the present disclosure include systems, computer program products, and method for tracking the location of an item having a unique electromagnetic signature. Electromagnetic fields (EMF) exist whenever a positive or negative electrical charge is present. Metallic items such as keys, watches, phones and other items such as credit cards with embedded chips all produce EMF with unique low frequency wave signatures. A device searches for and records the EMF signature of the items and notes their relative location. The device may automatically update the location of the items once the unique EMF signature has been associated with an item when the EMF signature is detected by the device. Submitting a query identifies the last recorded location of the respective item enabling retrieval of the item when its location is not directly known.

Figure 1:
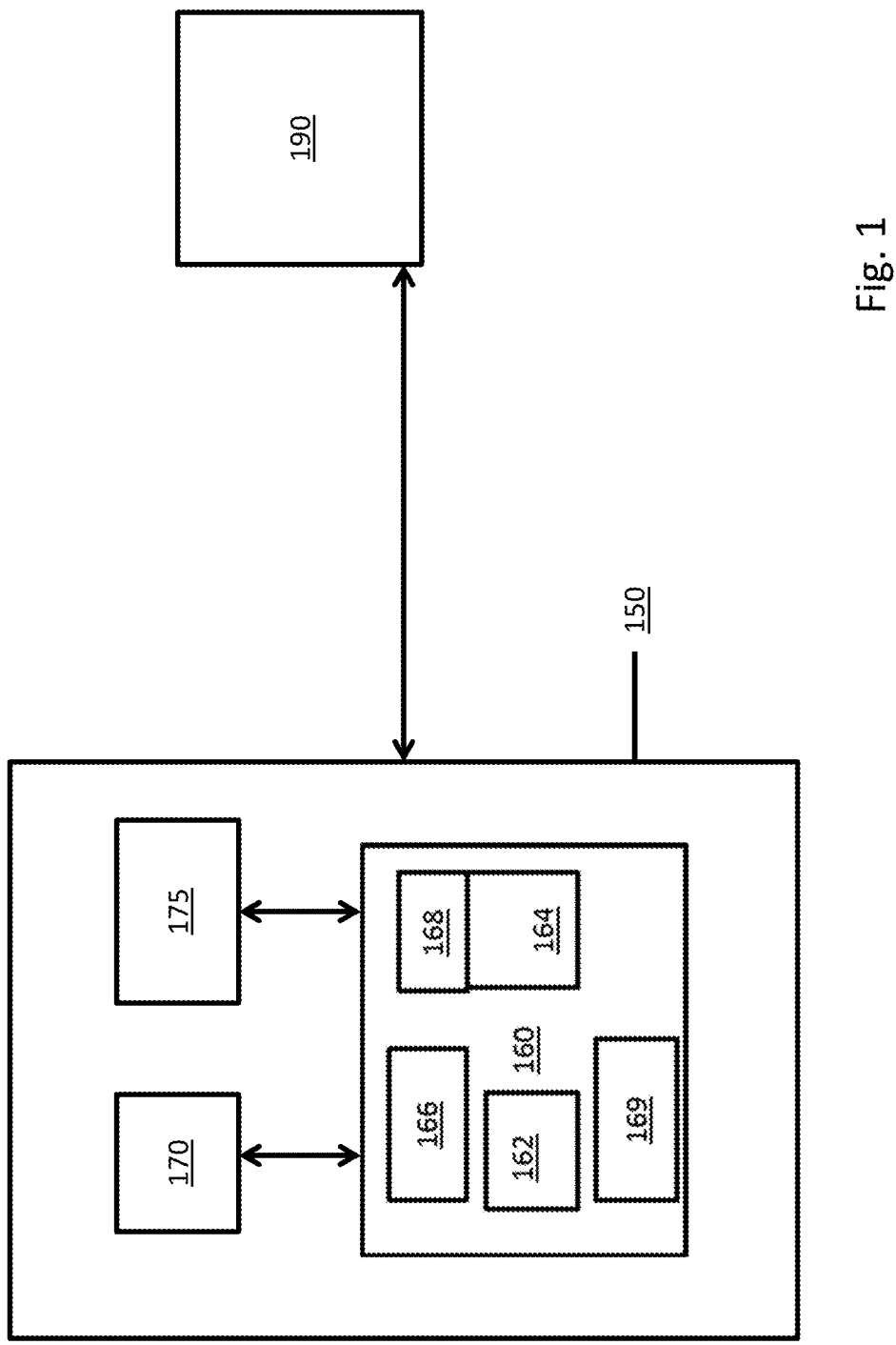
FIG. 1 illustrates a general overview of a system for registering the location of an item via an electromagnetic frequency signature according to one or more embodiments.

Turning now to a more detailed description of the present disclosure, there is shown in FIG. 1, a user device 160 for tracking items 170 and 175 within a location 150 such as a room in a house. User device 160 may be any type of computing device capable of communicating with another user device 160 via a network. User device 160 may include a desktop computer, a laptop mobile computer, a personal data assistant, or a smartphone. User device 160 includes a memory 164 and a processor 162 for controlling the operation of user device 160. In an embodiment, user device 160 is a mobile device which may be a smart wearable such as a smart watch or a smartphone and the respective memories and processors run an application for tracking and reporting the location of items via their respective EMF signatures. A remote database 190 may store the item location information for subsequent retrieval from a remote site. User device 160 includes Global Positioning systems (GPS) 166. User device 160 may include a microphone 169 for recording audio voice commands for initiating the recording the EMF signature of an item and/or displaying the location of a respective item, or initiate locating a respective item based upon a previously identified EMF signature of the item. The EMF signatures are stored in EMF signature files 168 stored in memory 164.

Figure 2:
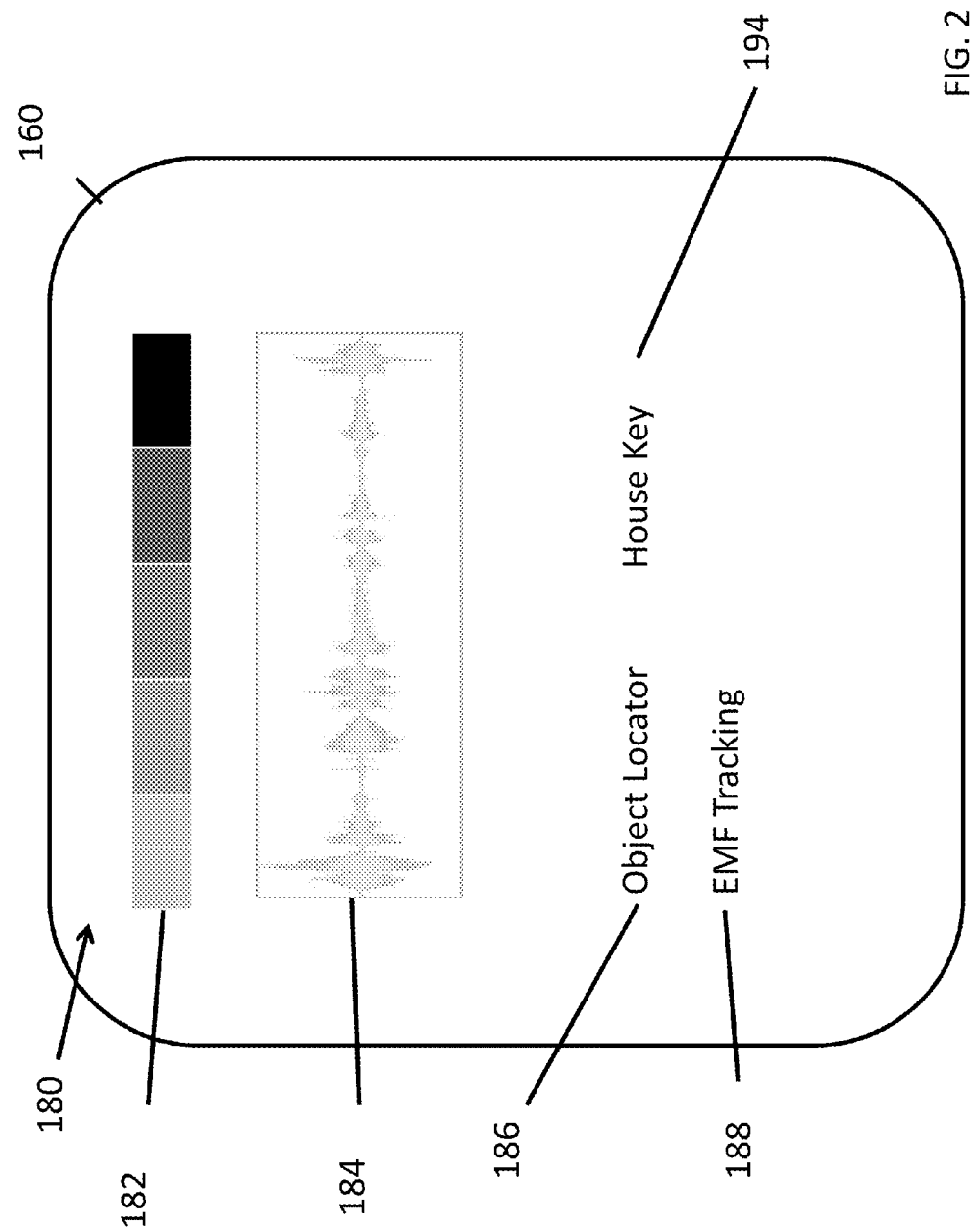
FIG. 2 illustrates a device for registering the location of an item via an electromagnetic frequency signature according to one or more embodiments.

As shown in FIG. 2, device 160 includes a display 180 for displaying information to the user. Display 180 may display an EMF signature 184 having a specific wavelength pattern or signature. Display 180 may display an EMF signal strength indicator 182 having a plurality of bars which are activated depending on the measured strength of the signal. Displaying the strength of the signal may provide an indication of the quality and accuracy of the EMF signal. The signal strength indicator may also be utilized when an item is being searched for indicating the relative position of the device with respect to the queried item. An object locator or user login 186 for the object locator application enables the user to initiate the processor in an item retrieval mode for conducting a search for EMF signals detectable by the device 160 for a respective object. An EMF tracking input key 188 enables the user to initiate the processor in an EMF tracking mode for conducting a search for EMF signals detectable by the device for tracking items having an EMF signature. An item identifier 194 is provided enabling the user to identify a detected EMF signature with a specific item when the device is in an EMF tracking mode. Item identifier 194 may be utilized for identifying a specific item for retrieval when the device is in item retrieval mode.

Figure 3:
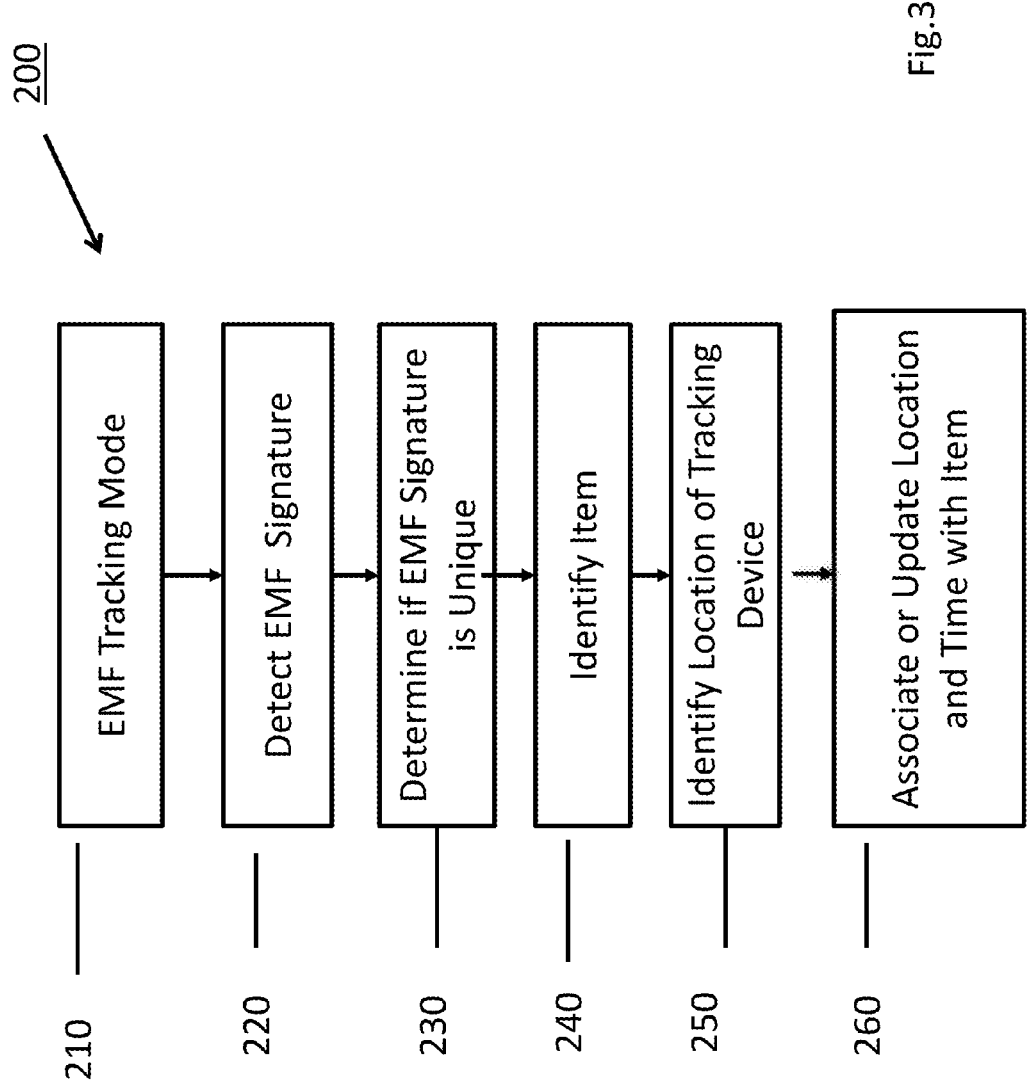
FIG. 3 illustrates a flow chart of a system for registering the location of an item via an electromagnetic frequency signature according to one or more embodiments.

According to one embodiment, as shown in FIG. 3, a user may utilize device 160 for identifying the location of items having a unique EMF signature which are discoverable by device 160 utilizing an EMF tracking mode 200. A user activates the device for EMF tracking mode at block 210 and utilizes the respective application. In the EMF tracking mode, the device, such as the smartphone, may provide a display for displaying a detected EMF signature and strength of the signal. At block 220, the device detects an EMF signature. Initially, a user may position an item which emits a unique EMF signature, such as a key, in the proximate vicinity of the device for receiving the EMF signature. If the item has not been previously identified, the signature is determined to be unique at block 230 and the user is prompted to identify the item at block 240. Once the item has been identified, the location of the device as provided by the GPS system is recorded at block 250 and the time the signal is identified is recorded at block 250. The device's location as provided by the GPS system of the item is recorded at block 250. The location and the time of the identification of the item are associated with the item at block 260 and stored as an EMF signature file. The corresponding EMF signature is also stored and associated with the item for subsequent utilization in updating the location of the item.

In operation a user activates the application to track a new item via the EMF tracker. The user may position the item for tracking in the proximate vicinity of the device to assure that a full EMF signal strength and associated signature is received by the device. If the item has not been associated with the device previously, the application requests that a name for the signature be provided. If the signal is not unique, the device is currently tracking the item. If the item is previously known, the location and time of the item detection is updated. If the items have been previously known, the user may activate the application and walk around a location such as a house and the application will automatically update the location of the item and the time which the location was identified. The recording of the location of an item may be updated while it is being continuously detected by the device. In this scenario, an EMF signature may initially be detected by the device at an initial location and time due to the sensitivity of the device however, the signal strength may be weak indicating that the detected item is not in the approximate proximity of the device. As the device approaches the tracked item, the signal strength may increase indicating that the device is closer to the tracked item and the location of the device at this time is a more accurate identifier of the location of the tracked item. Preferably, the location of the item is associated with the location of the device when the signal strength as detected is at the strongest value.

As shown in FIG. 4, a database 270 may be established identifying the respective items and the associated location of the item and the time that the location was determined. As shown in the database 270, in an embodiment, the GPS system is configured so the respective coordinates translate to the boundaries of a respective room in a location such as a house. In this embodiment, the user would track the boundaries of a particular room in the house and associate the respective GPS coordinates with the room defining a boundary associated with a particular room. As shown in FIG. 4, the user has identified different items having a unique EMF signature. The items include car keys, wallet and house keys. The EMF signature corresponding to the car keys was detected and tracked in the area where the device was identified as being in the bedroom and the most recent time which the car keys were tracked occurred at 11:59 on Monday. The EMF signature corresponding to the credit cards contained in a wallet occurred in the living room at 1:15 on Monday. The EMF signature corresponding to the house keys occurred in the kitchen at 2:00 on Monday. Preferably, the database 270 is stored in the memory associated with the device and also stored at a remote database associated with device 160. The redundant storage of the locations of the items enables the location of the respective items to be accessible by different users at different locations. For instance, if the user device is a smartphone, the smartphone may be at the office while a person at home may be looking for the house keys. Accessing the remote database enables the user at home to have access to the location of the respective items.

Figure 5:
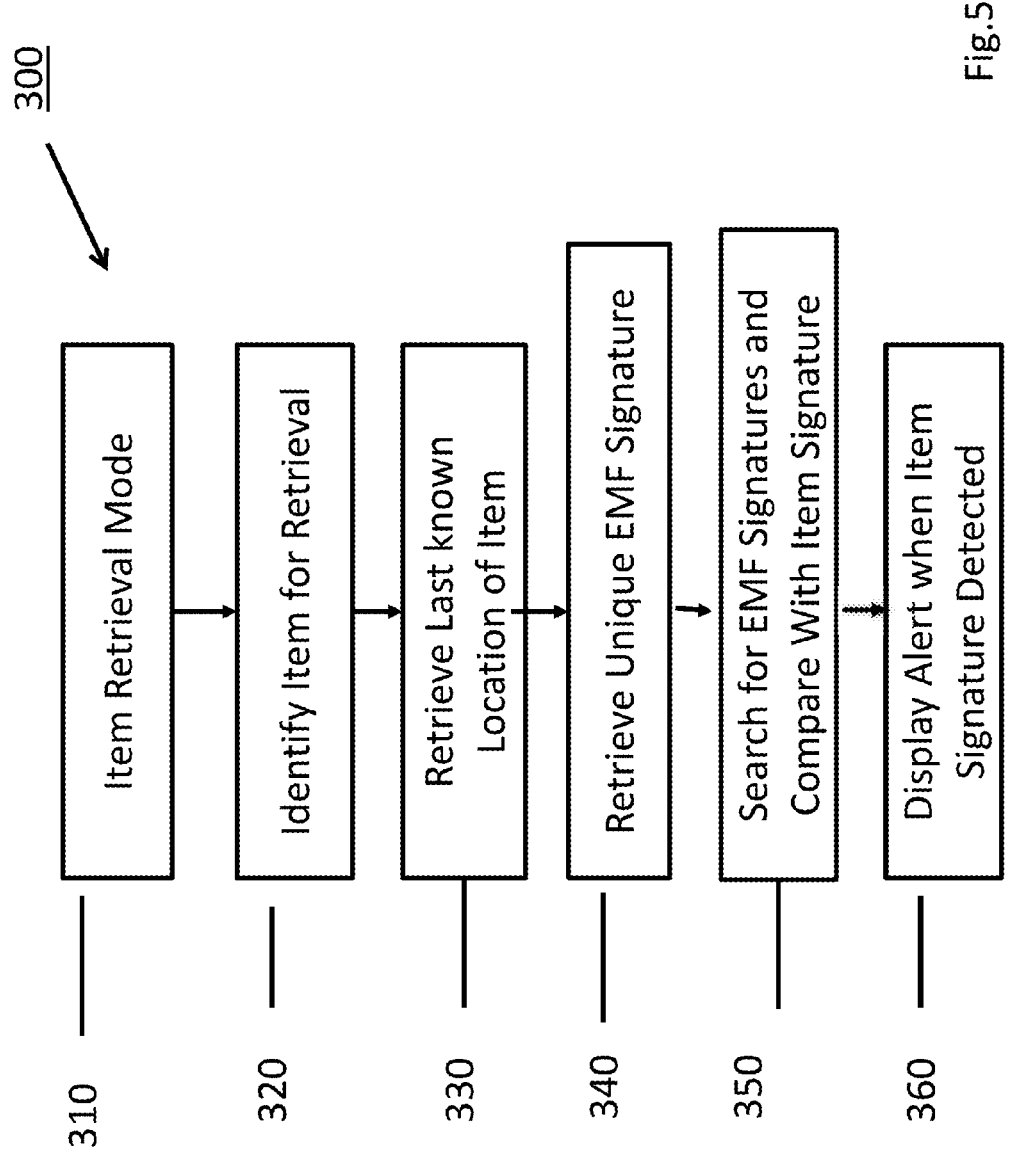
FIG. 5 illustrates a flow chart of a system for retrieving an item via an electromagnetic frequency signature according to one or more embodiments.

Referring to FIG. 5, once items have been identified and associated with their respective unique EMF signature, device 160 may be configured by the application to engage in an item retrieval mode 300. Item retrieval mode is initiated by the user at block 310. When device 160 is in item retrieval mode the display preferably provides a query screen for the user to identify the item for retrieval at block 320. Alternatively, a voice command may be initiated and received by the microphone. For example, the user may state "find car keys". If the user identified car keys, the display may provide the last known location as identified in the database 270, shown in FIG. 4, which is the bedroom. Further assistance in retrieving the item may be provided by utilizing the specific EMF signature of the identified item stored in the EMF signature file. At block 340 the unique EMF signature for the item, car keys, is retrieved. At block 350, the device is configured to search for the unique EMF signature and compare detected EMF signatures with the specific EMF signature of the identified item. If the specific EMF signature of the identified item is detected, the signal strength of the EMF signature may be activated on the display as an alert at block 360 indicating that the item's signature has been detected and the item is in the proximity of the device. The signal strength meter may be segmented to indicate the increasing or weakening of the detection of the EMF signature corresponding to the increase or decrease of the proximity of the device with the item being searched. Additional alerts may be provided such as audible or visual alerts.

In operation, the embodiment provides for a convenient system and method for maintaining an informed record of the location of various items which are generally misplaced but are trackable due to their unique EMF Signature. Initially the user utilizes the device and associated EMF tracking application for initializing a database with the identification of specific items with their unique EMF signature. By populating the database with this information, the user may maintain constant awareness of the location of the respective items by configuring the device in an item EMF tracking mode where the device preferably automatically updates the database with the location of the respective items as the user traverses a general location such as a house during a normal day. As the user traverses the house with the device such as a smartphone in a pocket, the smartphone is continuously searching and detecting EMF signatures, and for known items, the respective location of the user device upon detecting of the unique EMF signature is noted and the database is automatically updated. If the smartphone is connected via a network to a remote device may be utilized for storing the location of the respective items, the remote database is also automatically and preferably simultaneously updated. Preferably, the location of the user device is also stored in the remote database in the event that the user device is the item desired to be retrieved. Once the database has been populated, the device may be transitioned to an item locator by the application program. In this mode, the device provides the last identified and recorded location of an item based upon the detection of its respective EMF signature. Additionally, the device may search for the EMF signature corresponding to the item desired for retrieval. In this mode, the specific unique EMF signature of the item being searched for is utilized as a reference signature and compared with the EMF signatures detected by the device. When a match is discovered, the device becomes active alerting the user that the desired item is in the proximity of the user device.

Figure 6:
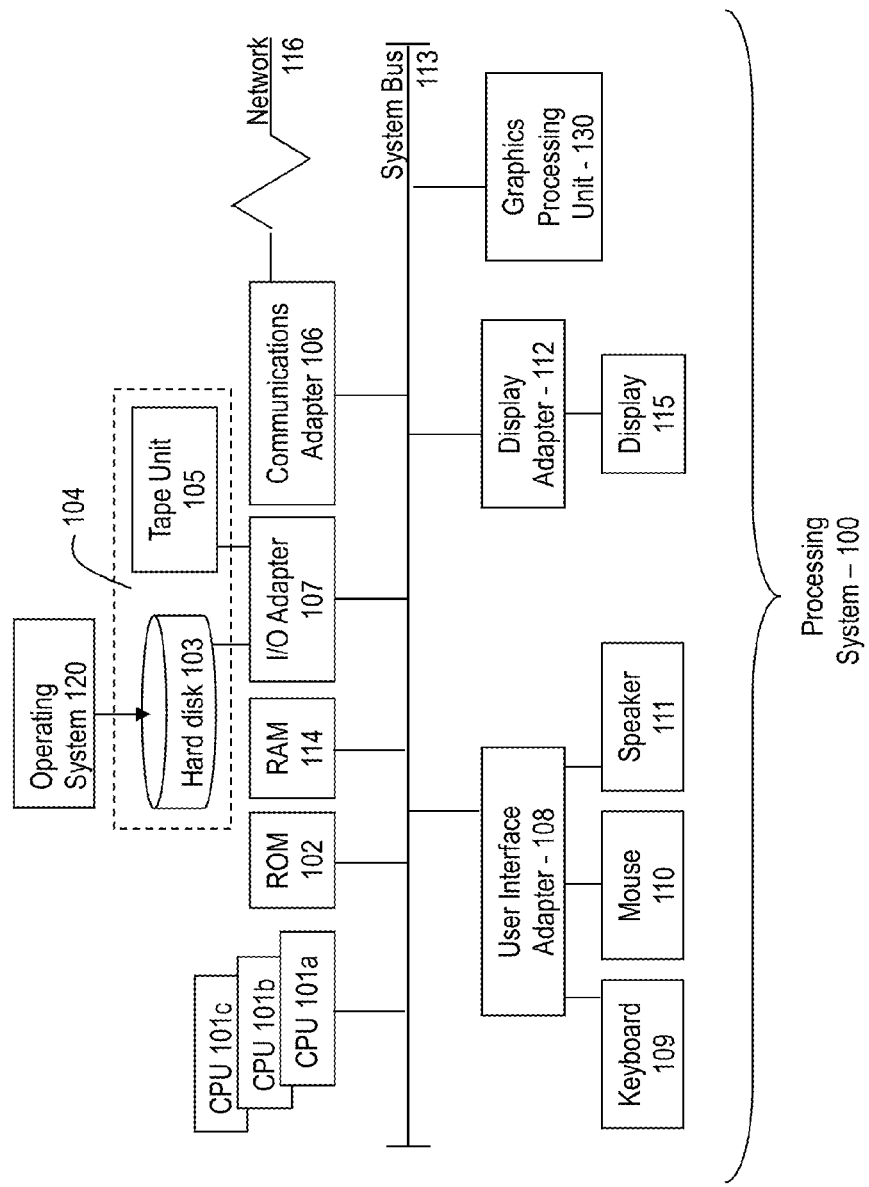
FIG. 6 shows a computer system according to an embodiment.

Referring to FIG. 6, there is shown primary computer system 100 according to one or more embodiments. First computing device 160 and second computing device may have the same configuration as primary computer system 100. The primary computer system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 6 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 6, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for tracking and retrieving an item having an electromagnetic frequency signature, the method comprising:
   obtaining, using a processor system of a device, an electromagnetic frequency signature of an item;
   identifying the item associated with the obtained electromagnetic frequency signature, a location of the device, and a time the item is identified;
   recording the identity of the item associated with the electromagnetic frequency signature, the location of the device, and the time the electromagnetic frequency signature is obtained for associating the item with the location of the device; and
   storing the recorded location of the item in a remote storage;
   wherein the device is a mobile apparatus comprising a processor and a memory in data communication with the processor, and a global positioning system (GPS) configured to generate information related to a current location of the mobile apparatus and the processor, and wherein the memory stores at least one application computer program configured for controlling the processor for obtaining the electromagnetic frequency signature of the item, the application computer program querying a user via the display to associate a name for the item with the obtained electromagnetic frequency signature;
   wherein a plurality of electromagnetic frequency signatures have been identified and associated with a plurality of items and wherein the method further includes determining that the user has enabled the device for obtaining the electromagnetic frequency signatures of a plurality of items previously identified and automatically updating the location of the previously identified item when the electromagnetic frequency signature corresponding to the previously identified item is obtained after the electromagnetic frequency signature is initially obtained, and wherein the location of the items stored in the remote storage are automatically updated when the device automatically updates the location previously identified items;
   wherein the device includes a display having a strength of signal indicator configured to display a strength of the electromagnetic frequency signature of the item relative to a position of the device using a plurality of bars that are selectively activated depending on the strength of the electromagnetic frequency signature of the item when tracking the item; and
   wherein the display of the device displays the recorded location and the time the electromagnetic frequency signature was obtained when retrieving the item.

2. The computer-implemented method of claim 1 wherein the mobile apparatus includes a microphone for receiving an audible command from a user directing the processor to display on the display the location of a respective item.

3. The computer-implemented method of claim 2 wherein the user submits a query requesting the location of a previously identified item, the display displaying the last recorded location of the item.

4. The computer-implemented method of claim 2 wherein the user submits a query requesting the location of a previously identified item, the application controlling the processor to search for and obtain an electromagnetic frequency spectrum of the item and directing the user to the location of the previously identified item.

5. A system for tracking an item having an electromagnetic frequency signature, the system comprising:
a processor system obtaining the electromagnetic frequency signature of an item;
a Global Positioning System, the Global Positioning System configured to generate information related to a current location of the mobile apparatus and the processor;
an input receiving the identification of the item having the electromagnetic frequency signature obtained by the processor system and a time associated with the identification;
the processor system associating the location of the processor system with the electromagnetic frequency signature, the identification of the item received by the input and the time associated with the identification;
a memory in communication with the processor system, the memory storing the identification, location and electromagnetic frequency signature of the item for subsequent retrieval, wherein the memory stores at least one application computer program configured for controlling the processor for obtaining the electromagnetic frequency signature of the item, the application computer program querying a user; and
a display in communication with the processor system, wherein the display displays the recorded location and the time the electromagnetic frequency signature was obtained when retrieving the item and displays a strength of signal indicator configured to display a strength of the electromagnetic frequency signature of the item relative to a position of the processor system using a plurality of bars that are selectively activated depending on the strength of the electromagnetic frequency signature of the item when tracking the item,
wherein the processor system is in communication with a remote storage, the remote device storing the location of the item;
wherein a plurality of electromagnetic frequency signatures have been identified and associated with a plurality of items and wherein a determination that the user has enabled the processor system to obtain the electromagnetic frequency signatures of a plurality of items previously identified and automatically update the location of the previously identified item when the electromagnetic frequency signature corresponding to the previously identified item is obtained after the electromagnetic frequency signature is initially obtained, and wherein the location of the items stored in the remote storage are automatically updated when the processor system automatically updates the location previously identified items.

6. The system of claim 5 including at least one application computer program configured for controlling the processor for obtaining the electromagnetic frequency signature of the item.

7. The system of claim 5 including a microphone for receiving an audible command from a user directing the processor to display on the display the location of a respective item.

8. A computer program product for tracking an item having an electromagnetic frequency signature, the computer program product comprising a computer readable storage medium having program instructions embodied therewith, the program instructions readable by a processing circuit to cause the processing circuit to perform a method comprising:
obtaining, using a processor system of a device, an electromagnetic frequency signature of an item;
identifying the electromagnetic frequency signature, a location of the device and a time the item is identified; and
recording the identity of the item associated with the electromagnetic frequency, the location of the device in a database and the time the electromagnetic frequency signature is obtained for associating the item with the location of the device;
storing the recorded location of the item in a remote storage;
wherein the device is a mobile apparatus comprising a processor and a memory in data communication with the processor, and a global positioning system (GPS) configured to generate information related to a current location of the mobile apparatus and the processor, and wherein the memory stores at least one application computer program configured for controlling the processor for obtaining the electromagnetic frequency signature of the item, the application computer program querying a user via the display to associate a name for the item with the obtained electromagnetic frequency signature;
wherein a plurality of electromagnetic frequency signatures have been identified and associated with a plurality of items and wherein the method further includes determining that the user has enabled the device for obtaining the electromagnetic frequency signatures of a plurality of items previously identified and automatically updating the location of the previously identified item when the electromagnetic frequency signature corresponding to the previously identified item is obtained after the electromagnetic frequency signature is initially obtained, and wherein the location of the items stored in the remote storage are automatically updated when the device automatically updates the location previously identified items;
wherein the device includes a display having a strength of signal indicator configured to display a strength of the electromagnetic frequency signature of the item relative to a position of the device using a plurality of bars that are selectively activated depending on the strength of the electromagnetic frequency signature of the item when tracking the item; and
wherein the display of the device displays the recorded location and the time the electromagnetic frequency signature was obtained when retrieving the item.

9. The computer program product of claim 8, wherein a user submits a query requesting the location of a previously identified item, the application controlling the processor to search for and obtain an electromagnetic frequency spectrum of the item and directing the user to the location of the previously identified item.

* * * * *